United States Patent
Rawdon et al.

(10) Patent No.: US 7,095,364 B1
(45) Date of Patent: Aug. 22, 2006

(54) ALTITUDE MEASUREMENT SYSTEM AND ASSOCIATED METHODS

(75) Inventors: Blaine K. Rawdon, San Pedro, CA (US); Zachary C. Hoisington, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/197,405

(22) Filed: Aug. 4, 2005

(51) Int. Cl.
G01S 13/08 (2006.01)
G01S 13/88 (2006.01)
G01S 13/95 (2006.01)
G01S 15/08 (2006.01)
G01S 15/88 (2006.01)

(52) U.S. Cl. .................. 342/120; 342/26 R; 342/26 B; 342/118; 342/165; 342/173; 342/174; 342/175; 342/195; 342/196; 702/189; 702/199; 701/3; 701/4; 367/87; 367/99; 356/5.01; 356/28; 73/384

(58) Field of Classification Search .................. 382/154; 701/3–13, 200, 207, 220; 367/87, 99–116; 356/4.01–5.15, 28, 28.5; 181/123, 124; 73/384–387; 702/127, 138, 139, 189, 198, 702/199; 342/25 R–26 D, 118, 120–122, 342/165–175, 189–197
See application file for complete search history.

(56) References Cited

U.S. PATENT DOCUMENTS

| | | | | |
|---|---|---|---|---|
| 3,573,825 A | * | 4/1971 | Westby | 342/120 |
| 3,611,378 A | * | 10/1971 | Goult et al. | 342/122 |
| 3,686,626 A | | 8/1972 | Bateman et al. | |
| 3,921,170 A | * | 11/1975 | Schmidt | 342/121 |
| 4,101,891 A | | 7/1978 | Jain et al. | |
| 4,174,520 A | * | 11/1979 | Westby | 342/120 |
| 4,468,638 A | * | 8/1984 | Kyriakos | 342/174 |
| 4,509,048 A | * | 4/1985 | Jain | 342/25 R |
| 4,633,255 A | * | 12/1986 | Trizna | 342/192 |
| 4,698,635 A | * | 10/1987 | Hilton et al. | 342/120 |
| 4,748,448 A | * | 5/1988 | Thompson | 342/26 A |
| 4,996,533 A | * | 2/1991 | May et al. | 342/195 |

(Continued)

FOREIGN PATENT DOCUMENTS

FR 2661744 A1 * 11/1991

OTHER PUBLICATIONS

A.R. Osborne, M. Onorato, M. Serio, L. Bergamasco, Soliton Creation and Destruction, Resonant Interactions, and Inelastic Collisions in Shallow Water Waves, *Physical Review Letters*, Oct. 26, 1998, pp. 3559-3562, vol. 81, No. 7.

(Continued)

*Primary Examiner*—Bernarr E. Gregory
(74) *Attorney, Agent, or Firm*—Alston & Bird LLP

(57) ABSTRACT

An altitude measuring system and method for aircraft is provided. The altitude measuring system includes altitude sensors for providing data to an altitude processing unit. The altitude processing unit spatially averages each output to determine a mean altitude. Pitch and roll are accounted for by correction. A method of determining aircraft altitude from a plurality of altitude sensors includes receiving altitude sensor data from each sensor and spatially averaging the altitude sensor outputs to determine aircraft altitude. A method of estimating the maximum height of an ocean surface includes receiving a plurality of altitude sensor data and determining a mathematical description of the ocean surface from the sensor data. The maximum probable wave height of the ocean surface is estimated from the mathematical description. From the maximum wave height, a cruise altitude may be determined.

18 Claims, 7 Drawing Sheets

U.S. PATENT DOCUMENTS

| | | | |
|---|---|---|---|
| 5,043,924 A * | 8/1991 | Hofmann | 382/154 |
| 5,046,010 A * | 9/1991 | Tomasi | 701/4 |
| 5,136,512 A | 8/1992 | Le Borne | |
| 5,177,487 A * | 1/1993 | Taylor et al. | 342/159 |
| 5,233,542 A * | 8/1993 | Hohner et al. | 702/199 |
| 5,264,852 A * | 11/1993 | Marquet | 342/26 A |
| 5,355,316 A * | 10/1994 | Knobbe | 701/220 |
| 5,469,168 A * | 11/1995 | Anderson | 342/26 D |
| 6,094,607 A * | 7/2000 | Diesel | 701/4 |
| 6,094,627 A * | 7/2000 | Peck et al. | 702/199 |
| 6,185,486 B1 | 2/2001 | Labounsky et al. | |
| 6,281,832 B1 * | 8/2001 | McElreath | 342/120 |
| 6,362,776 B1 | 3/2002 | Hager et al. | |
| 6,380,886 B1 * | 4/2002 | Jacobs | 342/120 |
| 6,382,022 B1 | 5/2002 | Martinez et al. | |
| 6,462,703 B1 * | 10/2002 | Hedrick | 342/120 |
| 6,507,289 B1 | 1/2003 | Johnson et al. | |
| 6,725,153 B1 * | 4/2004 | Persson | 342/120 |
| 6,848,650 B1 | 2/2005 | Hoisignton et al. | |
| 2002/0089433 A1 | 7/2002 | Bateman et al. | |
| 2004/0227658 A1 * | 11/2004 | VandenBerg | 342/25 R |

OTHER PUBLICATIONS

Alfred R. Osborne, Miguel Onorato, Marina Serio, The nonlinear dynamics of rogue waves and holes in deep-water gravity wave trains, *Physics Letters A 275*, 2000, pp. 386-393.

A.R. Osborne, The random and deterministic dynamics of 'rogue waves' in unidirectional, deep water wave trains, *Marine Structures*, 2001, pp. 1-19.

Miguel Onorato, Alfred R. Osborne, Marina Serio, Serena Bertone, Freak Waves in Random Oceanic Sea States, *Physical Review Letters*, Jun. 18, 2001, pp. 5831-5834, vol. 86, No. 25.

Boss International Web page, Feb. 16, 2005.

* cited by examiner

ALTITUDE MEASUREMENT SYSTEM AND ASSOCIATED METHODS

FIELD OF THE INVENTION

The present invention relates generally to altimeter systems and, more particularly, to altimeter systems for ground effect vehicles.

BACKGROUND OF THE INVENTION

Ground effect vehicles have been developed in both fields of aeronautics and marine craft. Ground effect vehicles are those vehicles which receive reduced drag due to the reduction of wing-tip vortices while traveling at low altitudes near ground, and more typically, near water. The closer the wing tip is to the ground or water, the lower the drag.

Ground effect vehicles generally include marine craft and aircraft. The two are typically distinguished by those that can sustain extended flight without the aid of ground effect (aircraft) and those that cannot (marine craft). The International Civil Aviation Organization (ICAO) and International Maritime Organization (IMO), both organizations of the United Nations, jointly exercise jurisdiction over these vehicles. The ICAO and IMO have also united to develop uniform navigation and safety rules for these types of vehicles.

Aircraft typically employ altimeter systems for determining their altitude with respect to sea level and ground level. Altimeters known to those of ordinary skill in the art include barometric altimeters, radar altimeters, forward-looking infrared (FLIR) and other types of on-board sensors. Of these, barometric altimeters are a standard or common technique for measuring the altitude of aircraft. Barometric altimeters operate on the principle that air pressure varies with altitude, so a measurement of absolute atmospheric pressure can be correlated with altitude.

Barometric altimeters are quite accurate with respect to the measurement of atmospheric pressure. However, there can be variations in atmospheric pressure over time at any given location and altitude. Variations result from weather systems and temperature variations. In practice, such variations are accommodated by periodically adjusting the altimeter to account for the local barometric pressure as relayed to the airplane from a fixed ground station of known altitude. This technique is not possible, however, over large expanses of ocean where no barometric stations exist. Furthermore, even if barometric pressure were known exactly, other uncertainties in the barometric system degrade accuracy. Uncertainties include variations in the aircraft's measurement of barometric pressure due to the influence and fluctuation of the ocean surface; variations in the aircraft's configuration (thrust level, flap setting, airspeed and the like); and variations in the height of the ocean surface due to waves, tides, wind and variations in barometric pressure.

Regardless of the type of altimeter, typically, one altimeter is employed and all portions of the aircraft are presumed to be at a single altitude. In contrast, ground effect vehicles flying much closer to the surface of the ocean are much more greatly affected by differences in wave height and terrain height with respect to portions of the aircraft. In prior embodiments of ground effect aircraft, the aircraft were designed to permit structural portions to touch water during routine flight or to even land on water. For example, the Russian Caspian Sea Monster employed pontoons in order to permit the wing tips to skip off the top of the water in routine flight. Accordingly, differences in wave height and terrain height were not a concern for these prior art ground effect vehicles.

Other aircraft employ ground proximity warning systems that generate warning envelopes to alert pilots to minimum flight altitude requirements based on expected ground terrain. Ground proximity warning systems analyze the flight parameters of the aircraft and the terrain based on sensors and databases in order to establish minimal altitudes and alerts. These are most often used in conjunction with runways and landing systems. These systems also employ other sensors including global positioning system, instrument landing systems with algorithms in combination with the altimeter system to determine appropriate minimum altitudes based on flight conditions such as described in U.S. Pat. No. 6,507,289 to Johnson. Some systems also employ feedback from sensors and transmitters employed in and about runway areas to provide feedback to the ground proximity warning systems such as described in U.S. Pat. No. 6,185,486 to Labounsky. Such systems are not easily adapted to altimeter systems of ground effect vehicles to determine minimum altitudes when flying very close to the ocean surface.

For example, as described in U.S. Pat. No. 6,848,650 to Hoisington, et al. future ground effect aircraft are expected to fly within 20 to 50 feet, and minimum altitude requirements will therefore be required to be determined relative to individual portions of the aircraft rather than using single radio altimeters to determine height from one particular point on the aircraft. In particular, the aerodynamic efficiency of ground effect aircraft is nearly twice that of conventional aircraft when flying at approximately 20 feet above the water. The efficiency reduces the amount of fuel burned and provides complementary increases in payload capacity. Every foot of altitude is important for the ground effect aircraft's efficiency and operating costs.

Accordingly there is a need in the art for an altitude-measuring system that permits determination of a minimum flight altitude so that altitude may be measured with an error of only inches or a few feet. Furthermore, the altitude-measuring system should take into account variations in ocean waves and other ocean surface or terrain properties to permit accurate calculations of minimum safe flying altitudes. As a result, minimum safe altitudes can be applied to improve fuel efficiency and operating costs for large transport ground effect aircraft.

BRIEF SUMMARY OF THE INVENTION

Accordingly, one embodiment of the present invention includes an altitude measuring system for aircraft. The altitude measuring system comprises a plurality of altitude sensors disposed on the aircraft. Each altitude sensor provides data to an altitude processing unit in communication with each of the plurality of altitude sensors, the altitude processing unit being capable of spatially averaging each output to determine a mean altitude. According to one aspect of the invention, an inertial measurement unit provides aircraft attitude parameters, such as pitch and roll, so that the altitude processing unit may correct each altitude sensor output to an altitude reference point from the attitude parameters. The system may further include a flight control computer for processing the altitude data to determine a flying altitude for the aircraft.

According to another embodiment, a method of determining aircraft altitude from a plurality of altitude sensors is provided. The method includes receiving altitude sensor data from each sensor and spatially averaging the altitude sensor outputs to determine aircraft altitude. Other aspects of the method include correcting each of the altitude sensor data to an altitude reference point on the aircraft. Also, each altitude sensor data may be analyzed for errors so that errant outputs are omitted from the spatial average. Further error correction may be achieved by filtering each of the altitude sensor data based upon frequency characteristics of the data. From the filtered data, an expected value of the altitude sensor may be calculated and spatially averaged to determine an expected aircraft altitude.

Another embodiment of the invention includes a method of estimating the maximum height of an ocean surface. The method includes receiving a plurality of altitude sensor data and determining a mathematical description of the ocean surface from the sensor data. The maximum probable wave height of the ocean surface is estimated from the mathematical description, such as by using Fourier analysis or other frequency analysis. From the maximum wave height, a cruise altitude may be determined.

BRIEF DESCRIPTION OF THE SEVERAL VIEWS OF THE DRAWINGS

Figure 1:
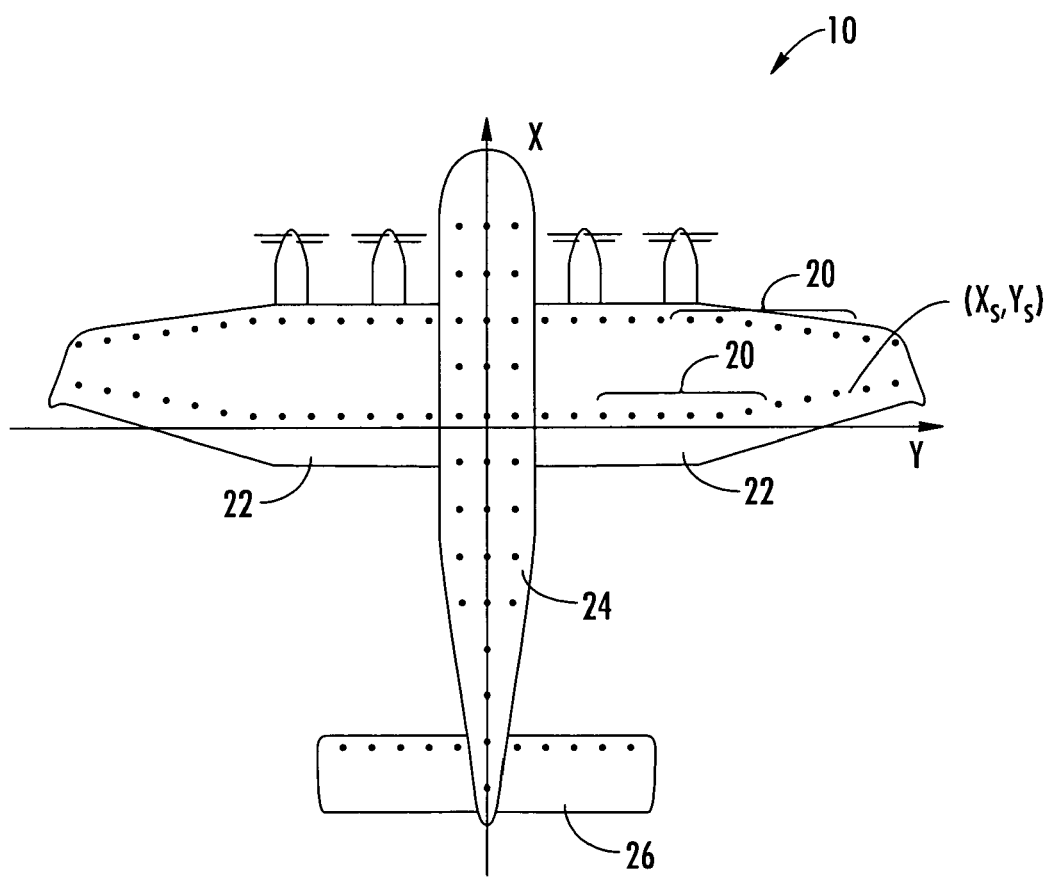
Figure 2A:
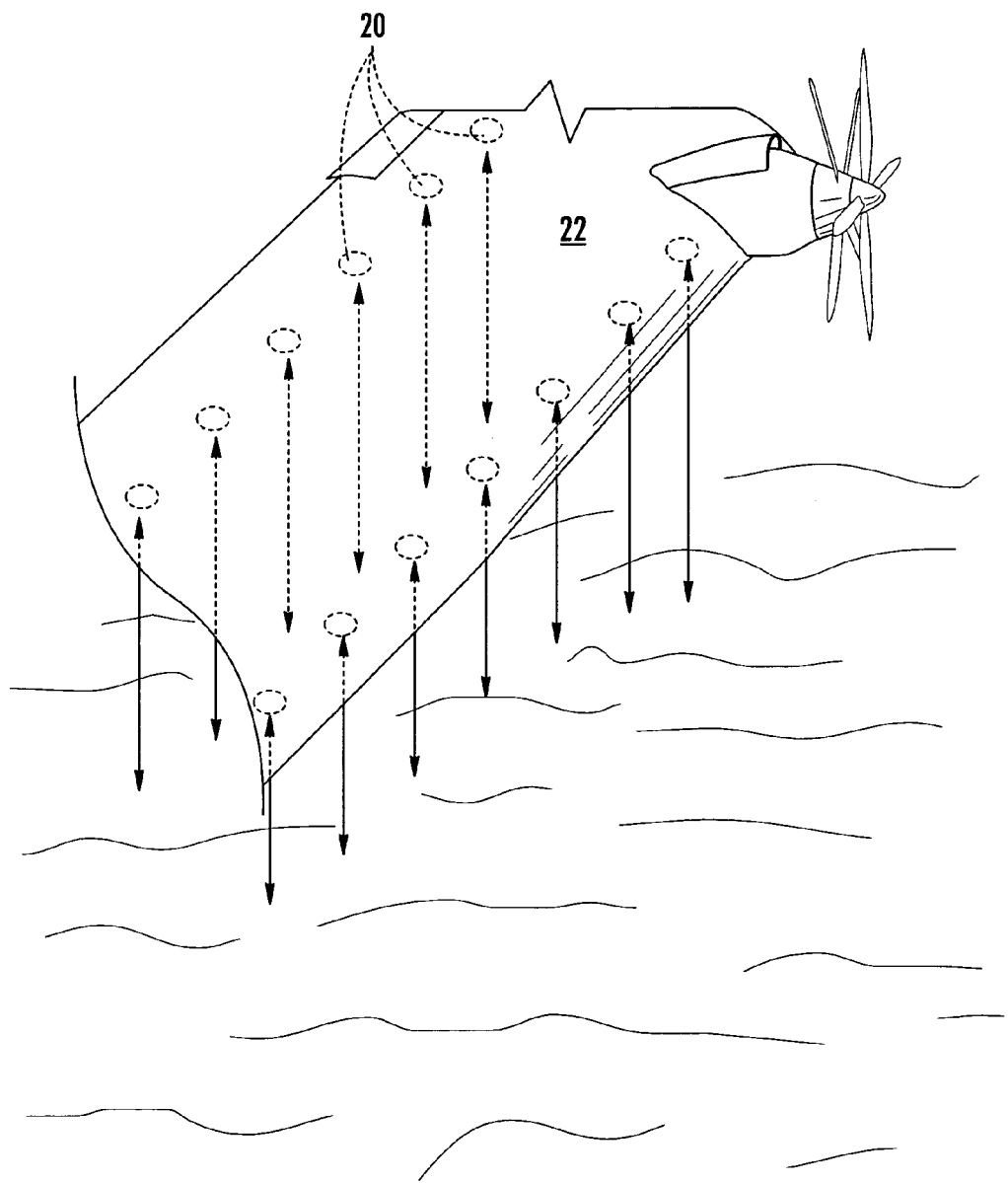
Figure 3:
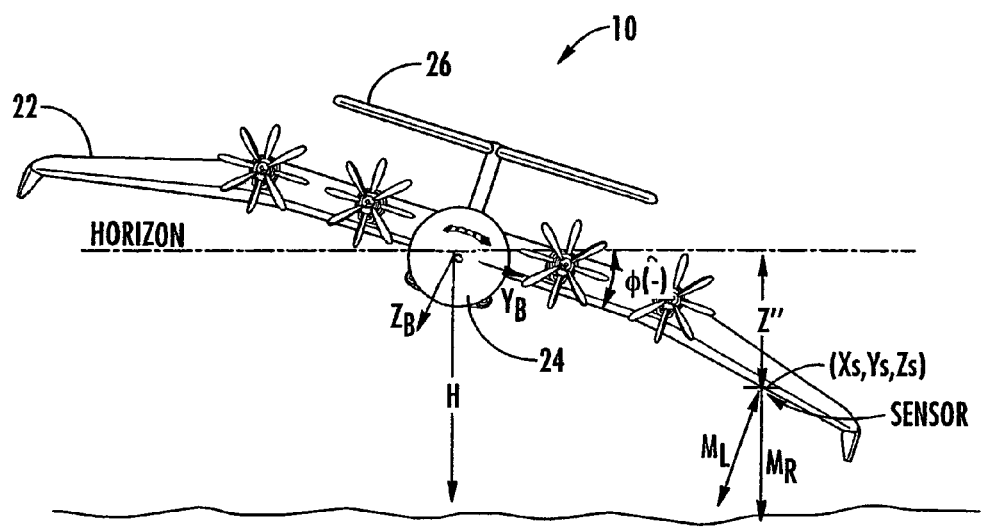
Figure 4:
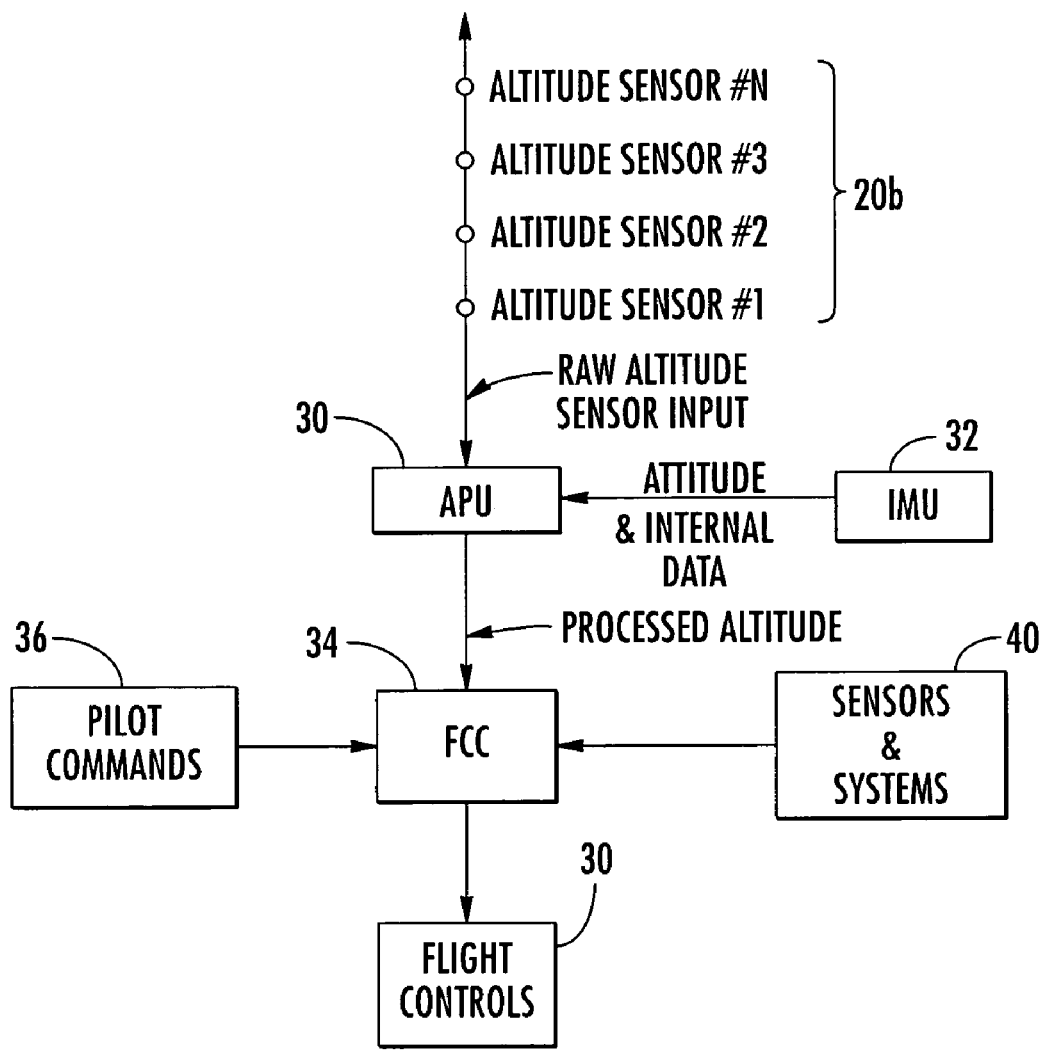
Figure 5:
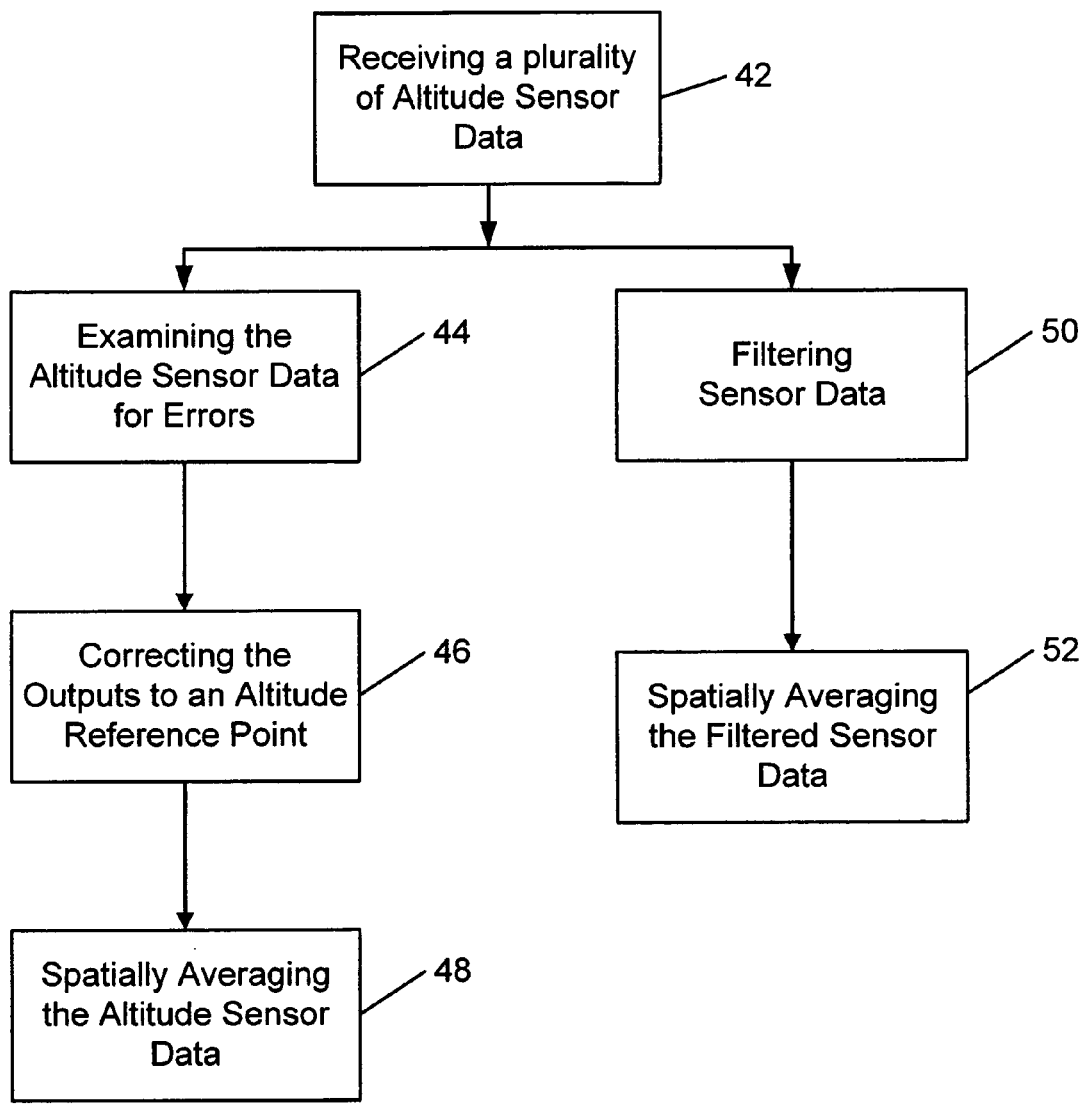
Figure 6:
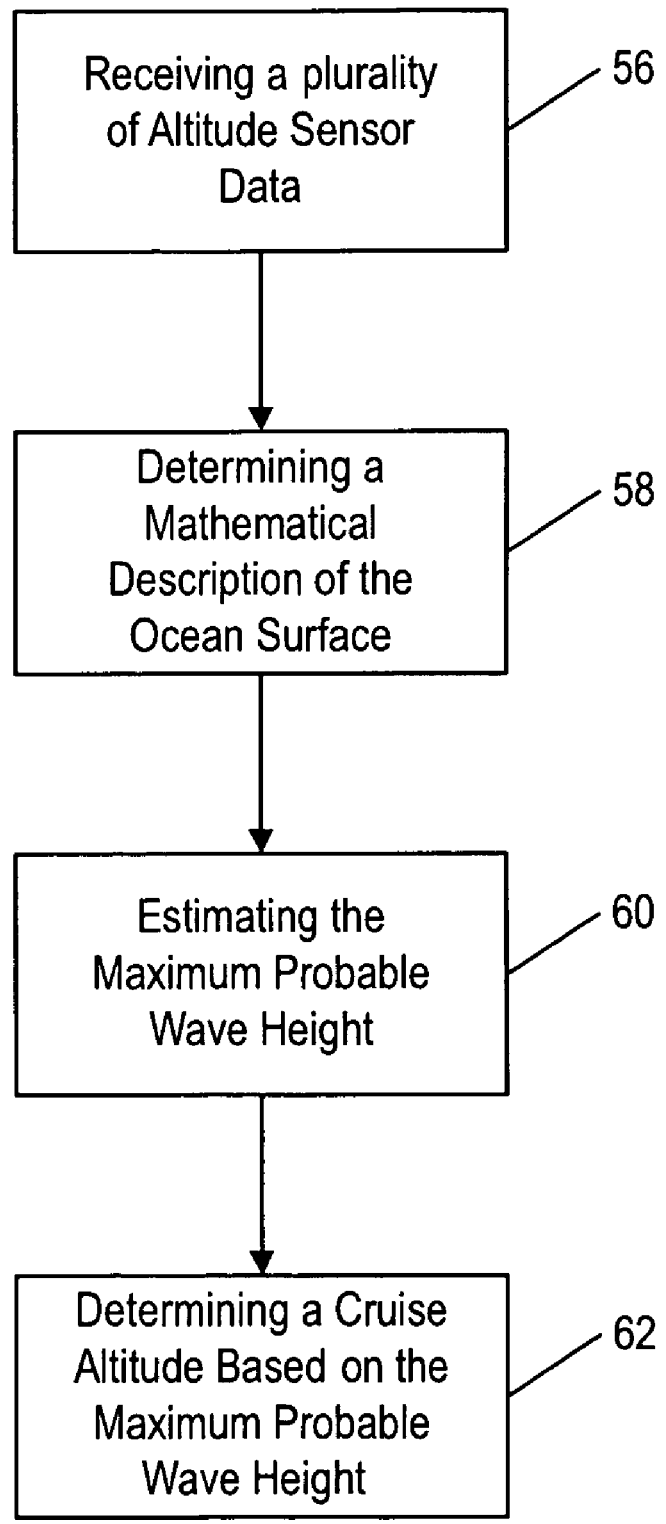

Having thus described the invention in general terms, reference will now be made to the accompanying drawings, which are not necessarily drawn to scale, and wherein:

FIG. 1 is a plan diagram of a plurality of altitude sensors on the underside of an aircraft according to one embodiment of the invention;

FIGS. 2(a) and (b) are embodiments of altitude sensors disposed on an aircraft wing according to alternative or complementary embodiments of the invention;

FIG. 3 is a front view of an aircraft identifying spatial and attitude parameters according to embodiments of the present invention;

FIG. 4 is a block diagram of an altitude measuring system according to one embodiment of the present invention;

FIG. 5 is a flow diagram of methods of determining aircraft altitude according to one embodiment of the present invention; and FIG. 6 is a flow diagram of a method of estimating maximum wave height and cruise altitude according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a ground effect aircraft is depicted including a plurality of altitude sensors 20 disposed on the underside of wings 22, fuselage 24 and stabilizer 26. Altitude sensors 20 typically include, but are not limited to, radio altimeters, laser or other electro-optic distance measuring altimeters. These sensors measure a time delay between the outgoing and reflected signals. Other types of sensors that may be employed include a sensor that uses the principle of parallax with sending and receiving components. The sending component projects a narrow beam or line in a fixed direction. This beam is reflected from the surface of the ocean or ground. A fixed receiving sensor is located at an offset distance from the sender. If a projected line is used, the offset direction of the sensor is perpendicular to the projected line. The receiver focuses the reflected beam onto a linear or planar array of sensing elements. Vertical motion of the reflective surface (ocean) results in a variation in the angle of the beam's reflection as seen by the offset receiving sensor. This variation results in the signal moving across the sensor array. In this way, a signal at a certain location on the sensor array can be correlated with a certain distance between the sender and the reflective (ocean) surface. Such a sensor is most accurate at relatively low altitudes. A second alternative altitude sensor type discerns the rate at which the image of a textured surface moves across its sensor array. When this rate and the aircraft's flight speed are known, the distance between the sensor and the (ocean) surface can be calculated using the geometry of similar triangles. Regardless of their type, these sensors are arrayed such that adjacent sensors do not interfere with one another.

Referring now to FIG. 2(A), the sensors 20 are depicted on the underside of a wing 22. The sensors have a beam width that is typically narrow and directed toward the surface of the ocean or other underlying terrain, although an ocean will be consistently referenced hereinbelow for purposes of example, but not of limitation. Return from the surface of the ocean is likewise measured by the sensor using the techniques as described above including time delay, angular rate and parallax. At the expected operating altitudes, e.g., 15 to 50 feet, these narrow beams may be employed to prevent overlap and interference between sensors.

According to one embodiment of an altitude measurement system, sensor spacing should be less than one-quarter of the wave length of the smallest ocean waves of interest to provide sufficient detail about the wave structure. For most ocean waves, wave height is limited to about one-seventh of the peak-to-peak wave length of the ocean wave. Accordingly, shorter wave length waves have lower maximum wave heights.

Minimum wave heights of interest can be determined by the aircraft designer within the realm of the minimum error of the altitude sensor. For example, if the ocean surface is smooth with a wave height less than a few inches or a foot the wave height may be determined to be below a minimum threshold of concern. In particular, the margin of altitude drift of the aircraft is typically a larger concern at this point.

Figure 2B:
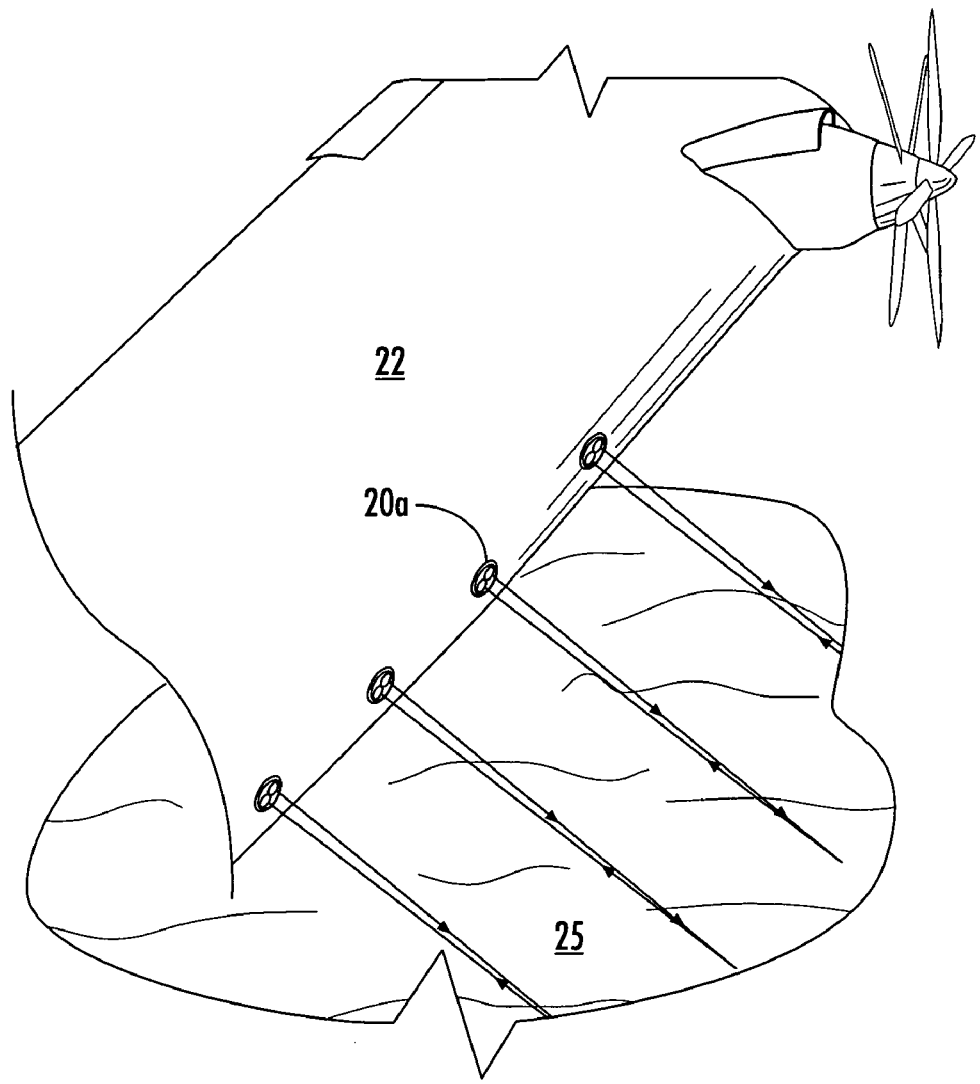

Referring now to FIG. 2(B) other sensors may be employed that are not necessarily downward-looking. For example, in this embodiment, the parallax sensor 20a might include a forward-looking element and a receiving element that receives the reflected portion of the forward image transmitted. These systems might also be used in combination with downward-looking systems (such as described in FIG. 2(A)) to provide additional data and improve resolution. Furthermore, forward-looking systems may be combined with speed data similarly to angular rate sensors to estimate wave height and expected wave height under the aircraft. Thus the data might be provided in a more time-sensitive manner and reduce the time estimation correction employed in the downward-looking sensor algorithms explained in more detail below.

Referring now to FIG. 4, a system for determining the altitude is depicted. The system includes altitude sensors 20b numbered 1 through N corresponding to altitude sensors 20 disposed on various portions of the aircraft. The altitude sensors 20 may be spatially averaged to provide mean heights of the altitude sensors over the surface of the ocean. Averaging may take into account positions of the sensors relative to a reference position on the aircraft in both vertical and horizontal planes. For example, referring back to FIG. 1, a sensor 20 may be identified by its horizontal x and y displacement from a coordinate reference point. In this case, a particular weighting in the averaging algorithm may be dependent upon the horizontal distance from the reference point. Sensors 20 on the fuselage 24, for example, may be given greater importance in the averaging determination to determine the mean height of the ocean surface. As such, sensors with a larger x and y displacement from the fuselage may be given less weight. If wing height above the ocean surface is a greater concern than fuselage height above the ocean surface, the reverse may also be employed giving greater importance to the altitude sensors disposed at a greater distance from the reference point.

The altitude processing unit 30 of FIG. 4 receives raw altitude data from each of the altitude sensors 20b disposed across the fuselage, wing span and stabilizer. The altitude sensors 20b may be a plurality of the same type of sensors or combinations of different types of sensors to provide multiple inputs of altitude data with respect to aircraft coordinates. The altitude processing unit also receives attitude and inertial data from the inertial measurement unit 32. Inertial data may include aircraft speed, attitude (pitch or roll) among other inertial measurements commonly provided to flight control systems. After processing the inertial data and altitude data by spatially averaging the data and normalizing a data to a common reference point, the altitude processor unit 30 provides the processed altitude to the flight control computer 34 (FCC). The flight control computer 34 receives pilot commands 36 and commands from other sensors and systems 40 to provide, among other things, controls for auto pilot, altitude commands for both auto pilot and manual pilot. The outputs of the FCC 34 are provided to numerous flight controls 38 which employ both the altitude data among other data supplied by the flight control computer.

Referring now to FIGS. 4 and 5, according to one embodiment of the altitude processing unit and a method to determine aircraft altitude, the altitude processing unit employs a method to spatially average the altitude data from each of the altitude sensors 20A. Knowing the geometric coordinates of each sensor with respect to a reference point and the aircraft's pitch and roll attitudes, the altitude processing unit 30 receives data from different sensors, block 42. The altitude processing unit may correct for differing altitudes of the aircraft based on the attitude of the aircraft, such as pitch and roll of the aircraft, block 46. Referring back to FIG. 1, altitude correction may occur by referencing x and y coordinates referenced to a common point along the fuselage. In FIG. 3, the z coordinate is similarly referenced in the vertical direction from the same reference point. As illustrated in the following equation, a corrected altitude may be obtained from the attitude input by the following equation.

$$H=(M_L \cos \theta \cos \phi)+Z'' \qquad \text{equation (1)}$$

where, H is the corrected altitude of the airplane reference point, $M_L$ is the uncorrected altitude measured by the sensor, $\theta$ is the pitch angle, $\phi$ is the roll angle and $Z''$ is a correction value as defined below. In the altitude processing unit 30, each sensor is individually corrected for attitude to the reference point. An inertial measurement unit 32, such as is commonly associated with the flight control computer of the aircraft may be employed to determine the values of $\theta$ and $\phi$.

The correction value applied to each sensor therefore may be determined for any x and y and the solution is, $$Z'=(Z \cos \phi \cos \theta)+(Y \sin \phi \cos \theta)-(X \sin \theta) \qquad \text{equation (2)}$$

wherein X, Y and Z are the coordinates of the respective sensor relative to the reference point.

In an alternative embodiment some sensors may include other directional sensors and systems 40 or altitude sensors that read vertically regardless of the attitude of the aircraft. In this case, the corrected altitude is given by $$H=M_R+Z'' \qquad \text{equation (3)}$$

where $M_R$ is the direct vertical height to the sensor. Such additional sensors may be optionally included in sensors and systems that are already existing to the flight control system or added for the purpose of determining vertical height.

According to one embodiment of an altitude processing unit and a method of determining aircraft altitude, the altitude processing unit may determine the existence of errors, block 44, from particular sensors in order to eliminate those errors from the altitude calculations. Errors are typically specific to the sensor type and error detection methods, algorithms, and tolerances are provided by sensor manufacturers. For example, error may be due to a failure of a particular sensor function, and the sensor defaults to a particular output to alert any monitoring system of a failure. Failures often result in elimination of the signal, non-variance of the signal, maximum signals, or values grossly inconsistent with neighboring sensor values. Any of these indications or more, usually each specific to the type of sensor employed in the system, may indicate failure, and these and other failure modes will be recognized by one of ordinary skill in the art when dealing with a particular sensor.

The altitude processing unit may employ precision and feedback algorithms to determine the accuracy of each particular sensor. For example, sensors may be identified by their failure modes, operating characteristics, output tolerances, the absence of a signal, or comparing their signal to others in determining gross inconsistencies from neighboring altitude sensors. In this regard, erroneous altitude sensors may be eliminated by the altitude processing unit during computation of the processed altitude. The altitude provided to the flight control computer is therefore devoid of erroneous sensor readings.

According to one method of determining aircraft altitude, the altitude processing unit spatially averages each of the altitude sensor inputs, block 48, after correction of each sensor for inertial and positional factors, as described above. According to the following equation $$\overline{H} = \frac{(H_1 + H_2 + H_3 \ldots + H_N)}{N} \qquad \text{equation (4)}$$

where $H_1$ through $H_N$ is the corrected altitude from sensors 1 through N (FIG. 4, 20b).

Additionally or alternatively, the altitude sensors may be weighted according to the importance of the sensor with respect to determining the mean altitude. For example, in low flying aircraft the wings tips position with respect to the ground may be more important as that may be the most likely structural portion to come into contact with the ground. In this regard, wing tip altitude sensors may be given greater importance in determining the desired flying altitude of the aircraft. For example, a weighting factor may be multiplied to those sensors' outputs to further protect the structural portion in that area from exceeding minimum clearance thresholds.

Accuracy and reductions in altitude fluctuation may also be improved by recording the input of each sensor over time, in particular to arrive at a contour pattern of the ocean surface. At any instant of time, the surface waves in the ocean approximate a series of parallel sinusoidal waves. The wave patterns exhibit fluctuations over time at an average altitude. By compiling these fluctuations over time, time varying characteristics of the wave may be compared to databases of similar expected wave characteristics.

In automated control systems, the time delay between sensor input and control output is important. Systems with little delay can be accurately controlled, and can follow a rapidly-changing and unpredictable path with precision. As time delay increases, the precision with which the system can follow a path (in space-time) is reduced as the capability for sharp response is diminished. If the control system is over-amplified in an attempt to increase the capability for sharp response there is a potential for the system to become unstable and overshoot the target path or enter into uncontrolled oscillations.

During a control system design, stability margin analysis is generally conducted. Among other things, margin analysis is designed to ensure that the resulting closed-loop system has adequate gain and phase margins. While the former protects the system from instabilities due to changes in the loop gain, it is the phase margin that provides a quantitative assessment of the system ability to tolerate a time delay. By way of example, it may be required to demonstrate that the closed-loop system has a gain margin which is no less than 6 db and a phase margin of at least 45 degrees. It is noted that the corresponding maximum time delay that the system can tolerate is inversely proportional to the frequency at which the phase margin occurs.

It is commonly an expressed intention of the altitude measuring system to enable the airplane to fly in a straight and level flight condition (aiming at achieving a 1-g level flight condition) at a steady and constant altitude above the mean sea level. However, the foregoing is somewhat of an oversimplification as an aircraft is actually commonly flown along a path that is not perfectly straight and level and does not generally operate at exactly one g. Instead, an aircraft is generally intended to fly along an arc that has a center point located approximately at the center of the earth. As a result, at typical cruise speeds, the aircraft reduces its pitch attitude by about four degrees per hour relative to a fixed inertial reference. Also, according to the aircraft's location and heading, its airspeed may add or subtract from the circumferential speed of the earth (due to rotation about the earth's axis) and result in greater or lesser vertical acceleration. At a typical cruise speed, a variation of vertical acceleration of up to approximately 0.005 g's may be expected according to location and heading.

Nevertheless, it is not generally the intention of the system to fly the airplane in the "terrain following" mode in which the airplane flies a contoured path at a fixed height above the ocean surface.

It is likely, but not necessary, that the primary altitude control sensor will be part of the inertial measurement unit (IMU). Among other things, this unit measures vertical acceleration with a high level of precision, although the measurements are typically noisy and benefit from filtering. In perfect straight and level flight, the vertical acceleration will be referred to as one g. The IMU senses and reports vertical acceleration many times per second (perhaps 100 Hz). This permits frequent corrections of the flight control system so that the flight stays straight and level. However, when flying at 240 knots just a few feet off the water, for example, even small errors in maintaining level flight can accumulate and lead to undesirable errors in altitude. A technique for keeping track of the actual airplane altitude so that altitude errors can be corrected and do not accumulate is therefore desirable. As mentioned above, conventional altitude measuring systems generally fail to provide sufficient accuracy for this function.

Altitude measurement of the ocean surface from the airplane by a single sensor will result in a signal that varies in height by a value equal to the full range of the ocean surface (maximum peak to minimum trough). Such a rapidly-varying signal cannot be used directly because it would tend to cause the airplane to go into the undesired "terrain following" mode described above. Instead, according to another embodiment of the present invention and with reference to FIG. 5, the single sensor signal may be filtered to focus on the desired components of the signal while reducing the influence of the undesired component. See block 50. For example, the sensor signal may be filtered to limit the response of the system to a pre-specified range of frequencies, thereby reducing the fluctuation of the data to within a desired tolerance.

An object of filtering in this case is to reduce the higher frequency fluctuations of the signal and focus on the lower frequencies that more accurately represent the actual mean sea level, thereby reducing the uncertainty in the signals. However, the measurement of the low frequency signals requires more time and therefore somewhat reduce the currency of the altitude information. As such, the filter is generally designed to make an appropriate trade off between the currency of the altitude information and the uncertainty. For example, an instantaneous measurement can be made in which case the exact altitude is known at that very instant, but the measurement is completely uncertain with respect to where on the ocean surface the measurement was taken, i.e., peak, trough or in the middle. As such, the instantaneous measurement does not necessarily provide information regarding the height above the mean sea level. Conversely, if a more lengthy measurement is made that focuses on the low frequency signal, there is much less uncertainty about the average altitude over that period of time, but there is uncertainty regarding the current altitude. It could be that the airplane has descended during the measurement period such that the current altitude might be significantly less than the average altitude over the period.

So, the flight control system is advantageously designed to appropriately trade off between uncertainty of altitude as represented by relatively rapid fluctuations of filtered altitude, and the time lag inherent in the measurements leading to uncertainty in the present position. The flight control system may be tailored in various manners as desired for the particular situation to work with both of these characteristics. In the first case of rapid fluctuations of the altitude signal, it may be that the flight control system will be tuned to respond only weakly to small altitude errors (fluctuations) so that it does not attempt to "terrain follow" the rapid fluctuations. This de-tuning leads to less precise altitude tracking than the airplane would be capable of if it had a perfect altitude signal. In the second case of time lag between the signal and control input, the maximum frequency response of the flight control system may be tailored, e.g., reduced, to accept the time delay as noted above, thereby relying to some degree on an averaged altitude signal as opposed to the current altitude. While such a reduced response also reduces the ability of the airplane to track the target altitude relative to one with a perfect altitude signal, the use of an averaged altitude signal substantially avoids issues related to the position of the aircraft relative to a wave. It is noted that frequency in this case may apply to the time domain (cycles per second) or to the spatial domain (cycles per meter) in that the filtering described herein may be applied in either domain.

The foregoing description relating to the trade off between higher and lower frequency components relates to measurements obtained by a single sensor. The altitude sensing accuracy can be improved, however, by employing multiple sensors in the manner described in the foregoing embodiments by reducing uncertainty (rapid fluctuations) and time lag. The measurements received from a plurality of sensors can processed in several different manners in accordance with various embodiments of the present invention.

For example, all of the processed but unfiltered signals from the plurality of sensors can be combined to determine an average altitude. In combining the signals from the sensors, each signal can be weighted according to its location or other characteristic in order to achieve a weighted average as described above in conjunction with other embodiments of the present invention. Due to the distribution of the sensors over a semi-random ocean surface, an averaged signal will generally have substantially less variation than the signal from any single sensor. Such a averaged signal can then be filtered to provide a balance between uncertainty (fluctuations) and time lag. As a result of the contributions from the plurality of sensors, the signal uncertainty and time lag will typically be substantially less than that of a single sensor system. Correspondingly, the aircraft flight control system can also typically track the target altitude with greater precision than would be possible with a single-sensor system.

Alternatively, the signals from each altitude sensor may be filtered individually, and then all of the filtered signals may then be combined by averaging or by weighted averaging. See block 52. In this case, the filtering may be adjusted (relative to the single-sensor system) to provide greater signal fluctuation in exchange for less signal delay. The subsequent combining of the signals could then reduce the fluctuation level to be in balance with the time delay. This embodiment would also enable a flight control system that tracks the target altitude with greater precision than a single-sensor system.

Using knowledge of the expected nature of waves and databases that include characteristics of waves for particular conditions, the sea state and surface contour of the ocean may be predicted in order to anticipate statistical changes in the ocean. In particular, many scientists are exploring probabilistic analysis of ocean waves to predict the occurrence of "rogue waves," which are large waves that are rare and otherwise unexpected occurrences. For example, A. R. Osborne has suggested a Fourier analysis to predict the likelihood of "rogue waves" in "Nonlinear Fourier Analysis of Ocean Waves in Random Wave Trains," U.S. Office Of Naval Research. See also A. R. Osborne, et al., "Nonlinear Fourier Analysis of Deep-Water, Random Wave Trains", Proceedings of the 8$^{th}$ International Workshop on Wave Hindcasting and Forecasting, Nov. 14–19, 2004; A. R. Osborne, et al., "The Nonlinear Dynamics of Rogue Waves and Holes in Deep-Water Gravity Wave Trains", Physics Letters A 275, pp. 386–93 (2000), M. Onorato, et al., "Freak Waves in Random Oceanic Sea States", Physical Review Letters, Vol. 86, No. 25, Jun. 18, 2001; A. R. Osborne, "The Random and Deterministic Dynamics of 'Rogue Waves' in Unidirectional, Deep-Water Wave Trains", Marine Structures, pp. 1–19 (2001); and Benjamin S. White, et al., "On the Chance of Freak Waves at Sea", J. Fluid Mechanics, Vol. 355, pp. 113–38(1998).

The probabilistic analysis may be employed with data from the individual altitude measurement. The altitude measurements may be mapped over time and space in order to arrive a mathematical description of the wave. Such algorithms are commercially available and include algorithms such as "Surfer", a three dimensional surface mapping software that mathematically represents three dimensional data (such as obtained from the plurality of altitude sensors) in contour, wireframe, shaded relief, image and vector maps. Surfer software is available form Golden Software, Inc. of Golden, Colo. Accordingly, employing probabilistic analysis in conjunction with contour mapping of the wave surface from the individual altitude measurements may provide a reliable predictor of sea state.

One such embodiment of a method for estimating the maximum height of an ocean surface is depicted in FIG. 6. Using the plurality of altitude sensor data, block 56, the altitude processing unit, or alternatively the flight control computer or a peripheral processor, may determine a mathematical description of the ocean surface, block 58, such as by "Surfer" or other algorithms. Using the wave analysis, such as the Fourier analysis offered by Osborne, the maximum expected wave height can be estimated for the given surface conditions, block 60. From the maximum estimate, the cruise altitude of the aircraft may be determined in order to avoid the maximum estimated sea state. As known to those of ordinary skill, the maximum estimated sea state is only a probabilistic estimate and is dependent upon commonly employed design safety margins, such as probability of avoiding collision or the ability to withstand a collision with some amount of water from the ocean surface. Accordingly, those of ordinary skill will note that the chosen cruise altitude will be selected in regards to these numerous design safety margins.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An altitude measuring system for aircraft, comprising:
a plurality of altitude sensors disposed in a plurality of locations on the aircraft, each altitude sensor providing altitude sensor data; and
an altitude processing unit in communication with each of the plurality of altitude sensors, wherein the altitude processing unit is capable of correcting each altitude sensor output to an altitude reference point, and wherein the altitude processing unit is further capable of spatially averaging the corrected altitude sensor output to determine a mean altitude.

2. The altitude measuring system according to claim 1, further comprising an inertial measurement unit providing aircraft attitude parameters selected from the group consisting of pitch and roll.

3. The altitude measuring system according to claim 1, further comprising a flight control computer for processing the altitude data to determine a flying altitude for the aircraft.

4. The altitude measuring system according to claim 1, wherein the altitude processing unit selectively weights the altitude sensor output.

5. The altitude measuring system according to claim 1, wherein the altitude processing unit is capable of correcting for pitch and roll of the aircraft.

6. The altitude measuring system according to claim 1, wherein the altitude processing unit examines the altitude sensor output for errors and omits errant outputs from the spatial average.

7. A method of determining aircraft altitude from a plurality of altitude sensors disposed in a plurality of locations on the aircraft, comprising:
receiving an altitude sensor data from each sensor;
correcting each of the altitude sensor data to an altitude reference point; and
spatially averaging the corrected altitude sensor data to determine aircraft altitude.

8. The method according to claim 7, wherein correcting the altitude sensor data comprises correcting for pitch and roll of the aircraft.

9. The method according to claim 7, further comprising examining each of the altitude sensor data for errors and omitting errant outputs from the spatially averaging step.

10. The method according to claim 7, further comprising filtering each of the altitude sensor data based upon frequency characteristics of the sensor data.

11. The method according to claim 10, further comprising calculating an expected value of the filtered altitude sensor data to provide an expected value of the altitude sensor data.

12. The method according to claim 11, further comprising spatially averaging the expected value to determine an expected aircraft altitude.

13. A method of estimating the maximum height of an ocean surface, comprising:
receiving a plurality of altitude sensor data spatially dispersed from different points about the aircraft;
determining a mathematical description of the ocean surface based upon the altitude sensor data; and
estimating the maximum probable wave height of the ocean surface from the mathematical description of the ocean surface.

14. The method according to claim 13, further comprising determining a cruise altitude for an aircraft based upon the maximum wave height.

15. The method according to claim 13, wherein determining the mathematical description comprises conducting a Fourier analysis of the amplitude, frequency and direction of the ocean surface.

16. The method according to claim 13, further comprising correcting the altitude sensor data to an altitude reference point prior to determining the mathematical description.

17. The method according to claim 16, wherein correcting the altitude sensor data comprises correcting for pitch and roll of the aircraft.

18. The method according to claim 16, further comprising examining the altitude sensor data for errors and omitting errant outputs prior to determining the mathematical description.

* * * * *